United States Patent Office.

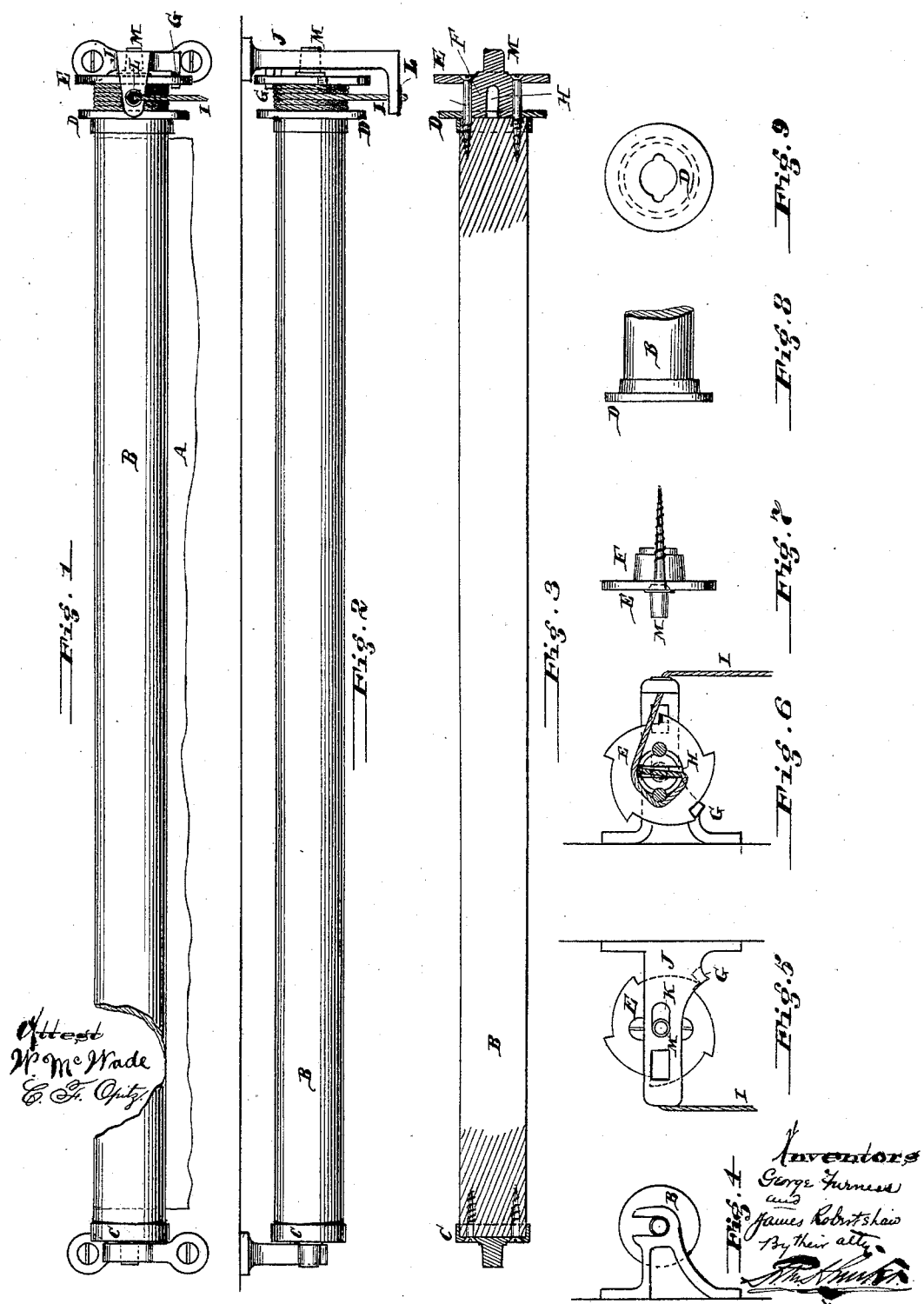

GEORGE FURNESS AND JAMES ROBERTSHAW, OF MANCHESTER, COUNTY OF LANCASTER, ENGLAND.

CURTAIN-ROLLER.

SPECIFICATION forming part of Letters Patent No. 286,191, dated October 9, 1883.

Application filed May 26, 1883. (No model.) Patented in England July 18, 1881, No. 3,116, and in France February 23, 1883, No. 153,863.

*To all whom it may concern:*

Be it known that we, GEORGE FURNESS and JAMES ROBERTSHAW, both of the city of Manchester, in the county of Lancaster, England, have invented an Improvement in Curtain-Rollers, of which the following is a specification.

The invention relates to improvements in and connected with appliances employed for raising, lowering, or holding window-blinds, &c., usually suspended from rollers, as is well understood. To one end of the said roller a metal disk cast or formed with a stud and flange is connected thereto by screws, and to the other end thereof a second disk is connected, having slots or openings formed therein, through which screws pass. A suitably-shaped ratchet-wheel cast or formed with any desired number of teeth is cast or formed with a stud and projecting boss having a slot therein to receive one end of a cord. The said boss abuts against the said metallic disk when fixed in position. The said boss is also formed with recesses, which receive the screws employed to connect the said ratchet or star wheel with the said disk and roller. The said stud or pin of the star or ratchet wheel is supported by a metal bracket. The bracket (usually mounted on the right of the roller when in position) is cast or formed with a suitably-shaped slot, in which slot said ratchet-wheel stud is permitted to roll to and fro when the blind is acted upon. The said bracket is also cast with a guide-eye, through which the cord from the boss passes, the object being to prevent the cord overriding the boss upon which it is wound. The bracket is also cast or formed with a projecting stud or pin, against which a tooth of the ratchet-wheel comes in contact when it is required to stop the blind in any desired position.

In the drawings, Figure 1 is a front view of a roller embodying our invention. Fig. 2 is a plan of same in position for raising the blind or curtain, or to allow the same to be lowered. Fig. 3 represents the blind-roller detached, with the ends thereof in section, and shows more clearly the manner of connecting the disks and ratchet-wheel to the end of the roller. Fig. 4 represents the bracket for supporting the stud in the end of the roller. Fig. 5 represents the ratchet-wheel when disengaged. Fig. 6 represents the manner of connecting the end of the cord to the boss of the ratchet-wheel. Fig. 7 represents a side view of the ratchet-wheel, boss, and screws for fastening the same to the end of the roller. Fig. 8 represents a side view of the metal disk screwed onto end of roller, and against which the boss of ratchet-wheel abuts. Fig. 9 represents a plan of the same.

The blind or curtain A is attached to the roller B in any suitable manner. To the ends of the said roller B metal clips C and D are secured by means of screws. The ratchet-wheel E, having in this example five teeth, is cast with a boss, F, which abuts against the end of the roller, as seen in Fig. 3, being held by means of screws which lie in the grooves or recesses formed on the periphery of the boss, whereby an even cylindrical surface is obtained. The bracket J is cast or formed with a projection, G, and with a slot, K. The blind, when free to run down or unwind from the roller, causes the said roller to advance in the slot K toward projection G, which action brings one or the other of the ratchet-teeth into contact with said projection G, and the further unwinding of the blind is instantly arrested. The said bracket J is also cast with a shoulder having formed therein an eye, L, into which an eyelet is fitted to reduce friction of the cord I. The manner of connecting the cord with the boss of the ratchet-wheel is seen more clearly in Fig. 6, in which it will be seen that the boss is split to receive and hold a knot formed on the end of the cord. The blind can be lowered to any desired extent by action of the cord, which is so arranged that when slightly pulled it causes the stud M to slide in the slot K, and the ratchet-teeth to move out of contact with the projection G, and the blind is free to unwind. When the cord is liberated, the rotation of the roller causes the stud M to advance in the slot, which action brings one or the other of the ratchet-teeth in contact with the projection G, and the further unwinding of the blind is instantly arrested. It will be readily understood that the appliances are equally applicable to the raising, holding, or lowering of maps, plans, charts, or other analogous articles.

While we have described a specific construction, even to small details, we do not limit ourselves to such, as our invention may be modified in various ways without departing from the novelty and utility of the same.

We are aware of the patents to Brothwell, December 6, 1870, and Barrett and Knight, October 21, 1879, and claim nothing therein set forth or shown.

Having now described our invention, what we claim as new, and desire to secure by Letters Patent, is—

1. A roller for curtains, maps, &c., loosely supported in bearings and adapted to be shifted horizontally, in combination with means to rotate said roller and shift the same, and a stationary locking device to prevent the rotation of the roller when shifted in one direction and free it when shifted in the other direction.

2. A roller for curtains, maps, &c., loosely supported in bearings, one end of which is arranged to slide in a horizontal slot, in combination with a stationary cord-guide, a cord to rotate said roller and cause it to be shifted to one end of said slot, a blind, curtain, map, &c., so wound upon said roller as to cause it to be rotated and move to the other end of said slot, and a stationary locking device to prevent the rotation of said roller when the same is at one end of the slot, substantially as and for the purpose specified.

3. The combination of roller B, brackets to support the same, flanged boss F, having stud M, screws F', and cord I, substantially as and for the purpose specified.

4. The combination of roller B, brackets J, one of which has a slot, K, and projection G, cord I, and ratchet-wheel E, secured to the end of the roller, substantially as and for the purpose specified.

5. The combination of roller B, provided on one end with boss F, having ratchet-wheel E and stud M, supporting-brackets J, one of which has a slot, K, and projection G, and cord I, substantially as set forth.

6. The combination of roller B, provided on one end with a ratchet-wheel, E, and stud M, supporting-brackets J, one of which has a slot, K, projection G, and guide-eye L, and cord I, substantially as set forth.

In testimony of which invention we hereunto set our hands.

GEORGE FURNESS.
JAMES ROBERTSHAW.

Witnesses:
ARTHUR C. HALL,
ALBERT E. HALL,
Manchester.